United States Patent
Greiter

(10) Patent No.: US 12,098,766 B2
(45) Date of Patent: Sep. 24, 2024

(54) GEAR MOTOR FOR A MOTOR VEHICLE AND MOTOR VEHICLE HAVING A GEAR MOTOR

(71) Applicant: AUDI AG, Ingolstadt (DE)

(72) Inventor: Ivo Greiter, Eitensheim (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 18/139,203

(22) Filed: Apr. 25, 2023

(65) Prior Publication Data
US 2023/0341044 A1 Oct. 26, 2023

(30) Foreign Application Priority Data
Apr. 26, 2022 (DE) .................... 10 2022 109 970.9

(51) Int. Cl.
*F16H 57/04* (2010.01)
*F16H 57/02* (2012.01)
(Continued)

(52) U.S. Cl.
CPC ..... *F16H 57/0476* (2013.01); *F16H 57/0415* (2013.01); *F16H 57/0436* (2013.01);
(Continued)

(58) Field of Classification Search
CPC ............. F16H 57/0476; F16H 57/0441; F16H 57/043; F16H 57/0423; F16H 57/045; F16H 57/0436; H02K 7/16; H02K 9/19
(Continued)

(56) References Cited

U.S. PATENT DOCUMENTS 5,372,213 A * 12/1994 Hasebe .................... B60K 1/02
184/6.12
5,415,603 A * 5/1995 Tuzuki ................ F16H 61/0206
903/906
(Continued)

FOREIGN PATENT DOCUMENTS

DE    102010062952 A1    6/2012
DE    102011082185 A1    3/2013
(Continued)

OTHER PUBLICATIONS

German Office Action, dated Dec. 16, 2022, for German Patent Application No. 102022109970.9. (5 pages).
(Continued)

*Primary Examiner* — Henry Y Liu
(74) *Attorney, Agent, or Firm* — Seed IP Law Group LLP

(57) ABSTRACT

A gear motor for a motor vehicle is provided comprising a housing having an engine housing section to contain an electric machine and a transmission housing section to contain a transmission coupled to the electric machine, wherein the electric machine, the transmission, and an oil collection tank are incorporated in an oil circuit, wherein oil for the cooling and/or lubricating of the electric machine and the transmission circulates in the oil circuit by at least one delivery device of the gear motor or the motor vehicle, and wherein the interior of the engine housing section and the interior of the transmission housing section are separated from each other such that the oil collects separately in the engine housing section and the transmission housing section at respectively at least one suction outlet connected to the delivery device, while a lower section of the transmission housing section in which the oil collects forms the oil collection tank.

13 Claims, 5 Drawing Sheets

(51) Int. Cl.
  *H02K 7/116* (2006.01)
  *H02K 9/19* (2006.01)
(52) U.S. Cl.
  CPC ....... *F16H 57/0445* (2013.01); *F16H 57/045* (2013.01); *F16H 57/046* (2013.01); *H02K 7/116* (2013.01); *H02K 9/19* (2013.01); *F16H 2057/02034* (2013.01); *F16H 2057/02043* (2013.01)
(58) Field of Classification Search
  USPC ...................................................... 184/6.12
  See application file for complete search history.

(56) References Cited

U.S. PATENT DOCUMENTS

| | | | | |
|---|---|---|---|---|
| 5,443,130 | A * | 8/1995 | Tanaka | H02K 7/116 180/65.6 |
| 5,718,302 | A * | 2/1998 | Hasebe | H02K 7/116 180/65.6 |
| 7,980,343 | B2 * | 7/2011 | Mogi | H02K 7/116 184/6.12 |
| 8,810,418 | B2 * | 8/2014 | Houle | B60K 1/02 184/26 |
| 8,840,511 | B2 * | 9/2014 | Seno | F16H 57/0423 184/6.12 |
| 8,905,885 | B2 * | 12/2014 | Yamamoto | B60K 6/26 184/6.12 |
| 9,242,637 | B2 * | 1/2016 | Miyamoto | B60W 20/00 |
| 10,197,151 | B2 * | 2/2019 | Nishimine | F16H 57/0441 |
| 10,766,350 | B2 * | 9/2020 | Ziemer | F16H 57/08 |
| 10,787,194 | B2 * | 9/2020 | Endo | F16H 57/0476 |
| 11,231,103 | B2 * | 1/2022 | Staake | F16H 57/0441 |
| 11,434,977 | B2 * | 9/2022 | Takahashi | F16H 1/06 |
| 11,473,669 | B2 * | 10/2022 | Endo | F16H 57/0476 |
| 11,588,379 | B2 * | 2/2023 | Steinz | B60K 1/00 |
| 11,619,297 | B2 * | 4/2023 | Yu | F16H 57/0457 184/6.12 |
| 11,662,013 | B2 * | 5/2023 | Tamai | H02K 7/116 184/6.12 |
| 11,701,956 | B2 * | 7/2023 | Brizendine | F16H 57/025 180/65.7 |
| 11,725,721 | B2 * | 8/2023 | Torii | F16H 57/0476 184/6.12 |
| 11,725,722 | B2 * | 8/2023 | Granottier | F16H 57/0457 74/467 |
| 2006/0213477 | A1 * | 9/2006 | Schulz-Andres | F04C 11/001 123/196 R |
| 2006/0231339 | A1 * | 10/2006 | Enomoto | B60K 6/365 184/6.9 |
| 2007/0265129 | A1 * | 11/2007 | Kasuya | B60K 6/405 475/32 |
| 2008/0135339 | A1 * | 6/2008 | Miller | F16H 57/0412 184/6.22 |
| 2009/0127954 | A1 * | 5/2009 | Mogi | F16H 57/0476 310/90 |
| 2009/0318255 | A1 * | 12/2009 | Kato | B60K 1/00 903/910 |
| 2013/0019707 | A1 * | 1/2013 | Ebihara | B60K 7/0007 74/468 |
| 2013/0125995 | A1 * | 5/2013 | Long | F16H 57/0404 137/544 |
| 2013/0192400 | A1 * | 8/2013 | Dodo | F16H 37/082 74/421 A |
| 2013/0192949 | A1 * | 8/2013 | Frait | F16H 57/0445 192/85.63 |
| 2013/0270038 | A1 * | 10/2013 | Nitta | B60L 50/60 184/6 |
| 2013/0305878 | A1 * | 11/2013 | Seno | F16H 57/0482 74/665 A |
| 2013/0313048 | A1 * | 11/2013 | Naqvi | F16H 61/12 701/33.9 |
| 2014/0174856 | A1 * | 6/2014 | Takagi | F16H 57/0436 184/6.12 |
| 2014/0179477 | A1 * | 6/2014 | Yamamoto | B60K 6/547 903/902 |
| 2014/0234124 | A1 * | 8/2014 | Ruhle | F16H 57/0473 417/364 |
| 2014/0262675 | A1 * | 9/2014 | Sugiyama | F16H 57/0483 192/85.01 |
| 2014/0326105 | A1 * | 11/2014 | Kasuya | B60K 6/387 74/661 |
| 2015/0051768 | A1 * | 2/2015 | Miyamoto | F01P 7/14 903/904 |
| 2015/0057858 | A1 * | 2/2015 | Nitta | F16H 57/0439 701/22 |
| 2015/0367793 | A1 * | 12/2015 | Ishikawa | B60R 17/02 903/917 |
| 2016/0146331 | A1 * | 5/2016 | Böhm | F16H 57/0436 184/26 |
| 2016/0160713 | A1 * | 6/2016 | Reedy | F16D 13/74 184/6.28 |
| 2017/0167596 | A1 * | 6/2017 | Nishimine | F16H 57/0435 |
| 2017/0219083 | A1 * | 8/2017 | Ito | F16H 57/0423 |
| 2017/0282909 | A1 * | 10/2017 | Swales | F16H 57/037 |
| 2017/0285062 | A1 * | 10/2017 | Kim | B60K 6/44 |
| 2017/0299047 | A1 * | 10/2017 | Warnecke | F16H 57/0441 |
| 2019/0081537 | A1 * | 3/2019 | Kiyokami | F16H 57/043 |
| 2019/0093755 | A1 * | 3/2019 | Kiyokami | F01P 11/00 |
| 2019/0093757 | A1 * | 3/2019 | Remboski | H02K 7/088 |
| 2019/0120369 | A1 * | 4/2019 | Staake | F16H 57/045 |
| 2019/0145509 | A1 * | 5/2019 | Yu | F16H 57/0421 184/11.1 |
| 2019/0176763 | A1 * | 6/2019 | Herrada | F16H 57/0412 |
| 2019/0186600 | A1 * | 6/2019 | Miyata | F16D 25/061 |
| 2019/0193550 | A1 * | 6/2019 | Ziemer | F16H 57/0471 |
| 2019/0195345 | A1 * | 6/2019 | Kataoka | F01M 11/0004 |
| 2019/0195346 | A1 * | 6/2019 | Kobayashi | F01M 1/16 |
| 2019/0229582 | A1 * | 7/2019 | Ito | B60K 1/00 |
| 2019/0270477 | A1 * | 9/2019 | Endo | F16C 33/7876 |
| 2020/0130408 | A1 * | 4/2020 | Remboski | H02K 7/006 |
| 2020/0149622 | A1 * | 5/2020 | Kuhl | F01M 1/12 |
| 2020/0240512 | A1 * | 7/2020 | Yashiro | F01M 5/00 |
| 2020/0244143 | A1 * | 7/2020 | Kiyooka | H02K 7/116 |
| 2020/0271194 | A1 * | 8/2020 | Takahashi | F16H 57/037 |
| 2020/0292055 | A1 * | 9/2020 | Endo | H02K 3/12 |
| 2020/0406740 | A1 * | 12/2020 | Takasugi | F16H 57/0476 |
| 2021/0006127 | A1 * | 1/2021 | Chen | B60K 11/06 |
| 2021/0006132 | A1 * | 1/2021 | Steinz | F16H 57/0417 |
| 2021/0039491 | A1 * | 2/2021 | Merz | F16H 57/04 |
| 2021/0053433 | A1 * | 2/2021 | Gyarmati | F16H 57/0436 |
| 2021/0095649 | A1 * | 4/2021 | Furushou | F04B 17/03 |
| 2021/0188099 | A1 * | 6/2021 | Janssen | B60W 10/08 |
| 2021/0231213 | A1 * | 7/2021 | Miebach | F16H 57/027 |
| 2022/0042591 | A1 * | 2/2022 | Yu | F16H 57/045 |
| 2022/0090673 | A1 * | 3/2022 | Tamai | F16H 57/0421 |
| 2022/0105790 | A1 * | 4/2022 | Brizendine | B60K 5/1233 |
| 2022/0316178 | A1 * | 10/2022 | Shinozaki | F16H 57/0424 |
| 2022/0316581 | A1 * | 10/2022 | Li | H02K 7/116 |
| 2022/0316583 | A1 * | 10/2022 | Granottier | F16H 57/0439 |
| 2022/0321050 | A1 * | 10/2022 | Jono | F16H 57/0413 |
| 2023/0019830 | A1 * | 1/2023 | Endo | H02K 3/38 |
| 2023/0103893 | A1 * | 4/2023 | Remboski | H02K 5/203 310/52 |
| 2023/0261542 | A1 * | 8/2023 | Yamaguchi | F16H 63/3425 310/54 |

FOREIGN PATENT DOCUMENTS

| | | |
|---|---|---|
| DE | 102013201238 A1 | 8/2013 |
| DE | 102011055192 B4 | 5/2014 |
| DE | 102014205881 B3 | 6/2015 |
| DE | 102016211226 B3 | 6/2017 |
| DE | 102018209340 B3 | 4/2019 |
| DE | 102019213588 A1 | 5/2020 |

(56) References Cited

FOREIGN PATENT DOCUMENTS

| JP | 2011152814 A | 8/2011 |
|----|--------------|--------|
| JP | 2020061859 A | 4/2020 |

OTHER PUBLICATIONS

German Office Action, dated Apr. 13, 2023, for German Patent Application No. 102022109970.9. (6 pages).

* cited by examiner

GEAR MOTOR FOR A MOTOR VEHICLE AND MOTOR VEHICLE HAVING A GEAR MOTOR

BACKGROUND

Technical Field

Embodiments of the present disclosure relate to a gear motor for a motor vehicle, and a motor vehicle having a gear motor.

Description of the Related Art

Gear motors are structural units comprising a motor, such as an electric motor, and a transmission connected to it. In gear motors there exists a need to cool and/or lubricate components which become heated on account of movement and/or electric currents. In this regard, the concept of wet and dry sump lubrication is known.

In the case of wet sump lubrication, an oil sump is formed in an oil pan, closing off the transmission and engine housing at the bottom. The moving components of the transmission dip into the oil sump, and oil is delivered by a pump from the oil sump to the corresponding lubrication sites.

In dry sump lubrication, on the other hand, components are not dipped into an oil sump, so that drag losses can be avoided. Instead, the oil collecting at the bottom in the housing is drained and delivered to a separate oil tank. From the oil tank, the oil is then delivered by a further pump to the lubrication sites. Although dry sump lubrication constitutes a more complex system than wet sump lubrication with not only one oil pump, benefits are obtained in terms of reliability of the lubricating action in highly slanting positions and/or under accelerations of the motor vehicle. Dry sump lubrication is often used in race cars or commercial machines for use in difficult terrain.

One concept regarding a lubrication system for a gear motor is known from the document JP 2020-61 859 A. The gear motor comprises an electric machine and a transmission, which are arranged in separate chambers divided from each other by a partition wall. Regarding the lubrication of the electric machine, oil is delivered from an oil sump formed in the transmission chamber to the engine chamber by a pump. Here, it flows back through an opening in the partition wall to the oil sump. For the lubrication of the transmission, the oil is delivered by a separate pump from the oil sump to an oil tank. From there, it flows downward to the transmission and back to the oil sump.

A further concept for an oil lubrication of a gear motor is known from the document DE 10 2014 205 881 B3. In this system, oil is pumped out from a transmission at the bottom and taken to a tank. From there, it is taken by a further pump to the transmission housing for the lubrication of the transmission.

The document JP 2011-152 814 A discloses a drive unit for a hybrid vehicle, comprising an engine and a transmission chamber, the chambers being separated from each other by a partition wall. Regarding the lubrication, oil is pumped out from the transmission chamber and taken on the one hand to the transmission and on the other hand to the electric motor. In order to equalize the oil levels in the chambers, a through opening is provided in the partition wall, along with a valve situated there, by which the clear passage can be opened and closed.

In the document DE 10 2010 062 952 A1, there is disclosed an offroad transmission with a dry sump lubrication, in which a transmission housing comprises an oil tank, forming a displacement volume for the oil situated in the transmission housing. The oil is delivered by a pump from the oil tank to the transmission components being lubricated and then collects in the lower region of the transmission housing. From here, it is delivered back to the oil tank by another pump.

BRIEF SUMMARY

Some embodiments provide an improved concept for a lubrication and/or cooling of a gear motor, such as in terms of a more simple and/or space-saving design.

According to an embodiment of the invention, a gear motor is provided which comprises a housing, which has a housing section to contain an electric machine and a transmission housing section to contain a transmission coupled to the electric machine, wherein the electric machine, the transmission and an oil collection tank are or can be incorporated in an oil circuit, wherein oil for the cooling and/or lubricating of the electric machine and the transmission circulates in the oil circuit by at least one delivery device of the gear motor or the motor vehicle, wherein the interior space of the engine housing section and the interior space of the transmission housing section are separated from each other such that the oil collects separately in the engine housing section and the transmission housing section at respectively at least one suction outlet connected to the delivery device, while a lower section of the transmission housing section in which the oil collects forms the oil collection tank.

In the gear motor described herein, a dry sump lubrication is realized, for which not only are the benefits typically existing for dry sump lubrication are present, but also the corresponding deficiencies as compared to wet sump lubrication, such as the greater system complexity, have been overcome.

Thus, in the gear motor described herein, oil present in the engine housing section and the transmission housing section collects, fluidically separated from each other, and by virtue of gravity, in a lower portion of the respective housing section. Accordingly, the oil circuit branches at least at one point, the electric machine being incorporated in one of the branches and the transmission in the other branch. The oil in these two branches is pumped out separately from the engine housing section and the transmission housing section by the delivery device. The suction outlets are provided for the draining of the oil from the housing sections. These can be openings which emerge into oil lines connected to the delivery device.

The fluidic separation of the oil during its collection or flowing together in the two housing sections provides great design freedom for the gear motor, since the oil cooling and lubricating the electric machine no longer needs to drain by gravity into the transmission housing section or be delivered there before it is pumped out by the delivery device. This allows for an extremely flat design of the gear motor.

In some embodiments, the lower portion of the transmission housing section forms the oil collection tank, in which the oil present in the transmission housing section collects. The oil collection tank is accordingly not a separate component, but instead it is integrated in an already present component of the gear motor, namely, the transmission housing section. The interior space of the transmission housing section is therefore utilized as efficiently as possible, so that an even more compact design is made possible in regard to the cooling and/or lubrication system or the gear motor. Since the oil present in the transmission housing section collects immediately in the oil collection tank, no pump or the like is needed for the delivery of the oil from the transmission housing section to the oil collection tank.

Regarding the oil collection tank, it is proposed that the oil not currently present in the other components of the circuit will collect there. Thus, the oil level currently present in the oil collection tank may depend on the current operating state of the gear motor or the oil circuit. The oil collection tank realizes an oil reservoir provided for buffering purposes.

The transmission housing section and the oil collection tank can be configured such that the oil remains in the oil collection tank until reaching a maximum slanted position or horizontal acceleration for which the motor vehicle is designed and does not come into contact with a component of the transmission. The suction outlets can be positioned and/or configured such that they are still covered with oil in such an extreme state. Accordingly, the motor vehicle can be a race car or an offroad vehicle or a commercial machine designed for very steep slopes.

The term "oil" shall mean any cooling and/or lubricating fluid by which a cooling and/or lubrication of the electric machine and the transmission can be performed.

The housing may consist of a metal. The engine housing section and/or the transmission housing section can be pot-shaped or cylindrical. The housing sections can be fastened to each other at the end face. The interior space of the engine housing section and/or the interior space of the transmission housing section can be separated from each other fluid-tight. This allows different pressure levels to be present in the interior spaces of the housing sections, if such is expedient.

Using the electric machine, a traction torque can be generated for driving the motor vehicle. For this, the electric machine is connected to an electric energy accumulator or a storage battery of the motor vehicle. The drive torque generated by the electric machine is transferred by a drive train to the wheels of the motor vehicle, while the drive train may comprise shafts, differentials, and the like. In particular, the drive train comprises the transmission, which connects a drive shaft and a power takeoff shaft to each other. The transmission can accordingly be coupled at the engine side to the drive shaft, which in turn is coupled to the electric machine. The transmission can be coupled at the wheel side to the power takeoff shaft, by which the torque can be passed on to the wheels, and which is coupled, for example, to an axle differential. By using the transmission, such as a shiftable transmission, the gear ratio of the drive shaft and the power takeoff shaft is established.

In some embodiments, the engine housing section comprises at least two suction outlets. These can be arranged and/or configured such that at least one of the suction outlets of the engine housing section is always covered with oil, even in event of a slanting position and/or under a horizontal force of acceleration of the motor vehicle, and therefore the oil can also be drained reliably from the engine housing section in such situations. This is advantageous because in the electric machine a dipping of the rotor into oil, such as occurs deliberately in the case of wet sump lubrication, should be prevented. According to one embodiment, the two suction outlets of the engine housing section are situated at the bottom and on opposite sides of the engine housing section.

Regarding the delivery device, it comprises a first pump and a second pump. The delivery device may be a unified component comprising the two pumps, which further contributes to the saving of design space.

The oil may be delivered from the engine housing section through the first pump, such as directly, to the oil collection tank. Thus, the at least one suction outlet of the engine housing section can be connected by an oil line or multiple oil lines to the first pump, while an outlet of the first pump on the pressure side can be connected by an oil line to the oil collection tank.

Moreover, the oil may be delivered from the oil collection tank through the second pump to the electric machine and the transmission. Accordingly, the second pump and the suction outlet of the transmission housing section can be connected by a corresponding oil line, while an outlet of the second pump on the pressure side can be connected to an oil line leading to the electric machine and the transmission.

Insofar as the at least two suction outlets of the engine housing section are provided, the first pump may comprise at least two suction inlets, each of which is connected respectively to one of the suction outlets of the engine housing section. The first pump may comprise a common outlet on the pressure side, which is connected to an inlet of the oil collection tank. Hence, the oil volumes flowing away from the suction outlets of the engine housing are brought together by the first pump and then pumped to the oil collection tank.

Regarding the delivery device, as an alternative to the first and second pump, the delivery device comprises a common pump or one which is connected at the intake side, such as separately, to the suction outlets of the engine housing and the oil collection tank, and at the pressure side to an inlet of the oil collection tank and at least one oil supply line leading to the electric machine and the transmission. The common pump is provided in this embodiment in place of the customary two pumps for a dry sump lubrication.

In some embodiments, the common pump comprises at least two suction inlets, one of which is connected to a suction outlet or at least one of the suction outlets of the engine housing section and another one which is connected to the suction outlet of the transmission housing section, i.e., that of the oil collection tank. By using the common pump in this embodiment, the oil volumes delivered from the suction outlets of the engine housing section and the oil collection tank are brought together. Thus, the common pump may comprise a common outlet on the pressure side, by which the oil can be delivered directly to the oil collection tank and to the electric machine and the transmission. An oil supply line leading away from the common pump can branch accordingly, with the oil going by one branch to the oil collection tank and by the other branch, which branches further in its later course, to the electric machine and to the transmission.

Insofar as the engine housing section comprises at least two suction outlets, the common pump comprises at least three suction inlets, at least two of which are connected to the suction outlets of the engine housing section. The common pump in this embodiment constitutes the point in the oil circuit where the oil pumped out from the housing sections separately and through multiple suction inlets is brought together.

Regarding the delivery device, it may comprise a vane pump. The vane pump, also known as a rotary slide pump, consists of a hollow cylinder or stator and a cylinder or rotor rotating inside the stator. The rotor has radially running, slot like guides, in which rotary slides are arranged. These are freely movable along the guides in the radial direction and during the rotation of the rotor they are pressed outward by centrifugal force as far as the inner wall of the hollow cylinder or stator, so that the space between the stator and rotor is divided into multiple chambers. The oil is delivered into these chambers by the rotary movement of the rotor and thus the co-rotating chambers.

One benefit of vane pumps is that, thanks to a form of the interior space of the stator differing from a circle, it can be divided into several separate delivery volumes, which in turn are each connected fluidically to one of the suction inlets. The separate or mutually separated delivery volumes can emerge into a common delivery volume of the vane pump, which in turn is fluidically connected to the outlet on the pressure side.

Insofar as the delivery device comprises the first and second pump, the first pump can be a two-stroke vane pump. That is, the interior space of the stator, viewed in cross section, is oval or elliptical in shape, so that two separate delivery volumes are formed. The second pump can be a gear pump.

Insofar as the delivery device comprises the common pump, the common pump can be a three-stroke vane pump. The interior space of the stator can be triangular-oval, so that three delivery volumes are formed. "Triangular-oval" means that the interior space, viewed in cross section, can have the shape of a triangle, the corners of which and possibly also the sides are rounded or curved.

The transmission or at least one component of the transmission can be accommodated at least partly inside at least one shell which is open at the top on one side, so that the oil collection tank is bounded by an interior wall of the transmission housing section and the shell and is open at the top, emerging into the rest of the interior space of the transmission housing section. The shell can be fastened by at least one connection web to the inner wall of the transmission housing section. Welded, screwed, or other suitable connections are conceivable for this. By "shell" is meant any container open at one end, such as of a housing type, in which the transmission or a component of the transmission can be appropriately contained or arranged. In one simple instance, the shell can be a cuboid open on one side, i.e., it can comprise five side walls, while the missing sixth side wall represents the opening of the shell. The shell or the oil collection tank can be closed off fluid-tight at the bottom, so that the shell dips into the oil present in the oil collection tank. The shell or the oil collection tank of the transmission housing section may be fluidically passable, such that it has boreholes or openings provided specifically for this purpose, so that the oil taken up in the oil collection tank emerges from it to a slight degree in order to produce an emergency lubrication of the transmission.

Insofar as the component of the transmission which is contained in the shell is a gear, the shell can be adapted to its shape. Thus, the shell can have the shape of a cylinder situated in the transmission housing section, being cut off along a plane running parallel with its longitudinal axis, and this cut surface forms the top-side opening of the shell.

The shell provides many benefits. Thus, the oil present in the interior space of the transmission housing section typically forms an oil mist, so that the components of the transmission are wetted with oil. By force of gravity, the oil in the interior space of the transmission housing section drifts downward in the course of time, and a portion of the oil collects here on account of the specific configuration of the shell. A kind of "minimal" oil sump can form in the shell at the bottom side, but on account of the movement of the transmission component located there it is once more moved or thrown out from the shell. The surface of the "minimal" oil sump reaches accordingly as far as the moving component of the transmission. Another portion of the oil present in the interior space of the transmission housing section collects at the bottom in the transmission housing section or next to the shell or, in other words, in the oil collection tank.

The oil can be brought by at least one spray ring into the interior space of the engine housing section. The oil supply line can emerge into the spray ring which is situated or secured in the interior space of the engine housing section, such as extending entirely along the circumferential direction of the electric machine and having openings distributed along this circumference, through which the oil is brought into the interior space of the engine housing section. In addition, or alternatively, the oil can be brought by a delivery lance into a rotor of the electric machine to form a rotor internal cooling. The delivery lance can extend along an axis of rotation of the rotor and be introduced into the rotor through the front end of the hollow rotor, whereupon the oil can be brought into the rotor interior space from a nozzle-like end of the delivery lance.

A heat exchanger may be incorporated in the cooling circuit for control of the temperature of the oil. The heat exchanger can be incorporated in a cooling circuit of the motor vehicle, in which a cooling fluid circulates, such as water, a mixture of water/glycol, or the like. Thus, heat can be transferred by the heat exchanger from the oil circuit to the cooling circuit, so that the cooling effect of the oil circuit is intensified.

The engine housing section may comprise a cooling water jacket, which is or can be incorporated in a cooling water circuit. The cooling water circuit can be a separate circuit or the cooling circuit in which the heat exchanger is also incorporated. The engine housing section in this embodiment comprises a housing wall forming or comprising the cooling water jacket. The cooling water jacket can be formed by cooling ducts running through the housing wall or by a cooling plate in thermal contact with the housing wall.

In order to prevent solids in the oil circuit, at least one oil screen or filter can be incorporated in it, by which particles such as abraded material from the transmission can be held back.

Besides the gear motor, some embodiments relate to a motor vehicle comprising a gear motor according to the preceding description. All benefits and features explained in the context of the gear motor can be applied equally to the motor vehicle and vice versa.

Regarding the delivery device, it can be provided that this is a component of the gear motor itself. Alternatively, the delivery device can be a component of the motor vehicle, in which case the gear motor will have corresponding connection interfaces by which it can be connected to the delivery device. Oil line flanges may be the interfaces. In this embodiment of the motor vehicle, a portion of the oil circuit extends in the region of the gear motor and another portion in the region of the motor vehicle.

BRIEF DESCRIPTION OF THE SEVERAL VIEWS OF THE DRAWINGS

Further benefits and details will emerge with the aid of the following explained embodiments as well as the figures.

DETAILED DESCRIPTION

Figure 1:
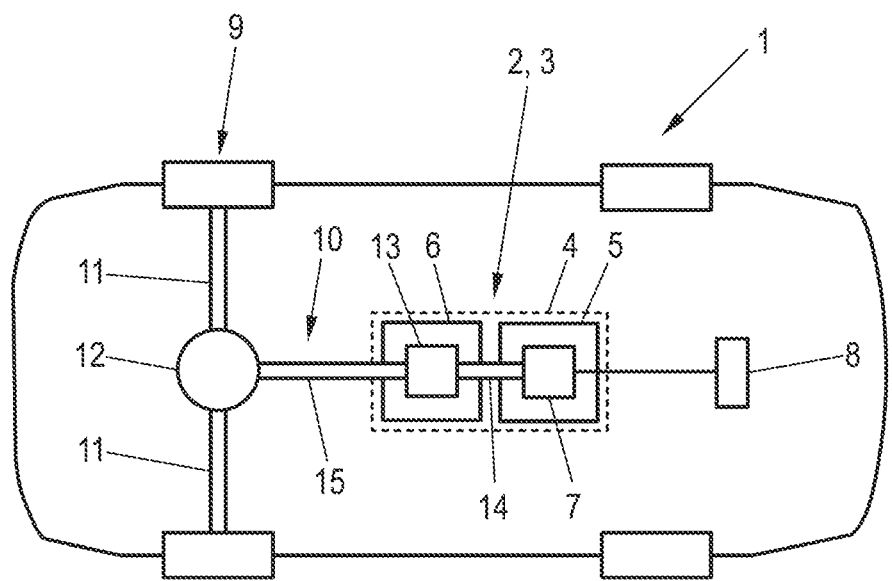
FIG. 1 shows an embodiment of a motor vehicle comprising a gear motor.

FIG. 1 shows an embodiment of a motor vehicle 1 comprising a gear motor 2, 3. Regarding the gear motor 2, 3, different configurations are conceivable, as shall be explained later on with the aid of FIGS. 2 and 4. In any case, the gear motor 2, 3 comprises a multipiece housing 4, indicated in FIG. 1 by the dotted line. The housing 4 has an engine housing section 5 and a transmission housing section 6. In the engine housing section 5 there is arranged an electric machine 7, which is connected to an electric energy accumulator 8 of the motor vehicle 1, designed as an electric vehicle, and being adapted and designed to generate a drive power or a corresponding drive torque to propel the motor vehicle 1.

A drive train 10 is provided to transfer the drive torque from the electric machine 7 to a rear axle 9 of the motor vehicle 1. The drive train 10 comprises axle shafts 11 and a differential 12, by which the drive torque can be divided proportionately and transferred to the two axle shafts 11 and the wheels of the rear axle 9 connected to them. The drive train 10 moreover comprises a shiftable transmission 13, arranged in the transmission housing section 6, which is connected at the motor side by a drive shaft 14 to the electric machine 7 and at the wheel side to a power takeoff shaft 15, coupled to the differential 12. The rotary speed is apportioned between the shafts 14, 15 by the transmission 13.

In the following, making reference to FIG. 2, a first embodiment of the gear motor 2 such as can be provided in the motor vehicle 1 will be explained.

Regarding the housing 4, the engine housing section 5 and the transmission housing section 6 are each cylindrical in shape and fastened to each other at the end face. For better clarity, neither the drive shaft 14 nor the power takeoff shaft 15 are shown in FIG. 2. However, a rotor shaft 16 of the electric machine 7 connected to the drive shaft 14 is shown. The electric machine 7, configured as an internal rotor, also comprises a rotor 18 coupled to the rotor shaft 16 and a stator 17. The transmission 13 is symbolized schematically in FIG. 2 as a gear.

For the cooling and lubricating of the electric machine 7 and the transmission 13 there is provided an oil circuit 19, in which the engine housing section 5 and the transmission housing section 6 are appropriately incorporated, along with an oil collection tank 20. Oil 21 circulates in the oil circuit 19, being delivered or pumped for this purpose by a delivery device 27.

Regarding the oil collection tank 20, this is formed from a bottom portion of the transmission housing section 6, in which the oil 21 collects by virtue of gravity. The transmission 13 or components of the transmission 13 are partly received inside a shell 22, open at the top. The oil collection tank 20 is accordingly bounded by the lower interior wall of the transmission housing section 6 and the shell 22. The oil collection tank 20 is open at the top and emerges into the rest of the interior space of the transmission housing section 6. The shell 22 is fastened by a not otherwise shown connection web to the interior wall of the transmission housing section 6. Depending on the present operating state of the motor vehicle 1 or the gear motor 2, different fill levels 23 of the oil 21 in the oil collection tank 20 will occur. The shell 22 is either fluid-tight or fluid-permeable, such as by virtue of specifically produced boreholes or openings of the shell 22, such that the oil 21 contained in the shell 22 emerges into the portion of the transmission housing section 6 where the transmission 13 is located, in order to perform an emergency lubrication of the transmission 13.

Regarding the housing sections 5, 6, the engine housing section 5 comprises a first suction outlet 24 and a second suction outlet 25 and the transmission housing section 6 comprises a suction outlet 26 for the draining of the oil 21 from the housing 4. The suction outlet 26 likewise constitutes a suction outlet 26 for the oil collection tank 20.

The oil 21 present in the engine housing section 5 and that present in the transmission housing section 6 for the cooling and/or lubrication of the electric machine 7 and the transmission 13 collects by virtue of gravity separately in the respective housing section 5, 6 at the suction outlets 24-26. Specifically, the oil 21 collects in the engine housing section 5 at least at one of the suction outlets 24, 25 and in the transmission housing section 6 at the suction outlet 26, forming a corresponding oil sump at the corresponding suction outlets 24-26, although this does not make contact with the components of the electric machine 7 and the transmission 13, so that the oil circuit 12 does not create a wet, but instead a dry sump lubrication.

Regarding the suction outlets 24, 25 of the engine housing section 5, these are arranged at the bottom, on opposite sides of the engine housing section 5. This ensures that at least one of the suction outlets 24, 25 is covered with oil 21, regardless of the present slanted positioning of the motor vehicle 1 and/or the present horizontal, i.e., longitudinal and/or transverse acceleration, so that the drainage of the oil 21 from the engine housing section 5 through the suction outlets 24, 25 is also ensured in such situations.

The delivery device 27 is provided for the delivery or circulation of the oil 21. The oil 21 is delivered from the oil collection tank 20 via the delivery device 27 and an oil supply line 28, which has a filtering or screening device 29, to the engine housing section 5 and to the transmission housing section 6. A heat exchanger 30 is incorporated in the oil supply line 28, by which heat is transferred from the oil circuit 19 to a cooling circuit 31, in which a water and glycol mixture is circulating, for example.

After the filtering or screening device 29 and the heat exchanger 30, the oil circuit 19 branches, so that a portion of the oil 21 carried in the oil supply line 28 is taken to the electric machine 7 and another portion to the transmission 13.

Regarding the branch going to the engine housing section 5, the oil 21 can be supplied to the electric machine 7 by two spray rings 32 and by a delivery lance 33. The spray rings 32 extend along the circumferential direction in the interior space of the engine housing section 5 and have outlet openings distributed along the circumferential direction, through which the oil 21 is introduced into the interior space of the engine housing section 5. The delivery lance 33 extends along the axis of rotation of the hollow rotor shaft 16 and is sprayed into this in order to form a rotor internal cooling. The oil 21 is taken by centrifugal force from the interior space of the rotor shaft 16 through openings of the shaft into the interior space of the engine housing section 5. The corresponding oil supply route is indicated by arrows in FIG. 2.

Because the electric machine 7 requires a more intense cooling than the transmission 13, on account of the electric currents there, a cooling water jacket 34 of the engine housing section 5 is provided for additional cooling. The cooling water jacket 34 is incorporated in a cooling water circuit 35, in which water circulates as the coolant. The cooling water circuit 35 can be the cooling water circuit 31.

Regarding the branch going to the transmission housing section 6, the oil 21 can be supplied to the transmission 13 through a spray nozzle 48. The oil 21 is present in the transmission housing section 6 as an oil mist wetting the components of the transmission 13, which settles to the bottom by force of gravity, namely, partly in the shell 22 and partly in the oil collection tank 20. Insofar as the oil 21 collects in the shell 22, it is taken up by the moving components of the transmission 13 located there and thrown back into the interior space of the transmission housing section 6.

Details shall now be given in regard to the delivery device 27. The delivery device 27 comprises a first pump 36 and a second pump 37. The oil 21 is delivered by the first pump 36 directly from the engine housing section 5 to the oil collection tank 20. The oil 21 is delivered by the second pump 37 from the oil collection tank 20 to the electric machine 7 and to the transmission 13.

Regarding the first pump 36, this has two suction inlets 38, 39, the first suction inlet 38 being connected to the first suction outlet 24 of the engine housing section 5 and the second suction inlet 39 being connected to the second suction outlet 25 of the engine housing section 5, each time by an oil line in which a filtering or screening device 29 is installed. The first pump 36 moreover comprises a common outlet 40 at the pressure side, which is connected to an inlet 41 of the oil collection tank 20.

Figure 3:
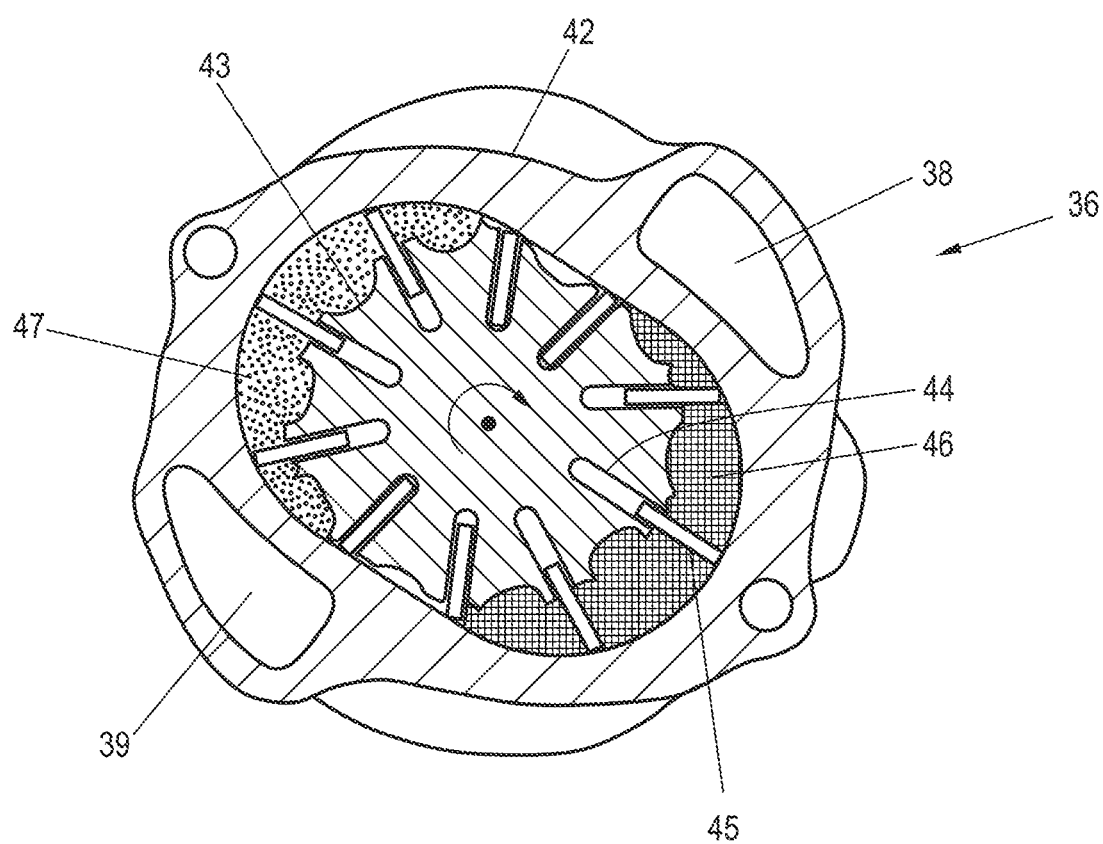
FIG. 3 shows a sectional view of a first pump of a delivery device of the gear motor of FIG. 2.

Further details are explained below in regard to the pumps 36, 37 of the delivery device 27. Thus, FIG. 3 shows a cross section through the first pump 36, which is a two-stroke vane pump. The first pump 36 comprises a hollow cylinder or stator 42 with an oval interior space. In this space is arranged a rotor 43, having radially extending guide slots 44, in which are received or arranged rotary vanes 45 which can move longitudinally in the radial direction and which move during the rotation of the rotor 43 outward up to the interior wall of the stator 42 or its interior space, by virtue of centrifugal force. Thanks to the oval shape of the interior space, two delivery volumes 46, 47 are formed, in which the oil 21 can be delivered separately. Thus, the first delivery volume 46 (indicated by the tiled surface) is connected to the first suction inlet 38 and the second delivery volume 47 (indicated by the dotted surface) is connected to the second suction inlet 39, while the delivery volumes 46, 47 emerge into the common outlet 40 at the pressure side, which is concealed in FIG. 3 by the rotor 43. The delivery volumes 46, 47 are symmetrically formed, so that the same oil delivery performance is produced in regard to the suction inlets 38, 39.

The second pump 37 is a gear pump, by which the oil 21 is pumped from the oil collection tank 20 through its suction outlet 26 and a corresponding filtering or screening device 29 to the oil supply line 28.

Figure 2:
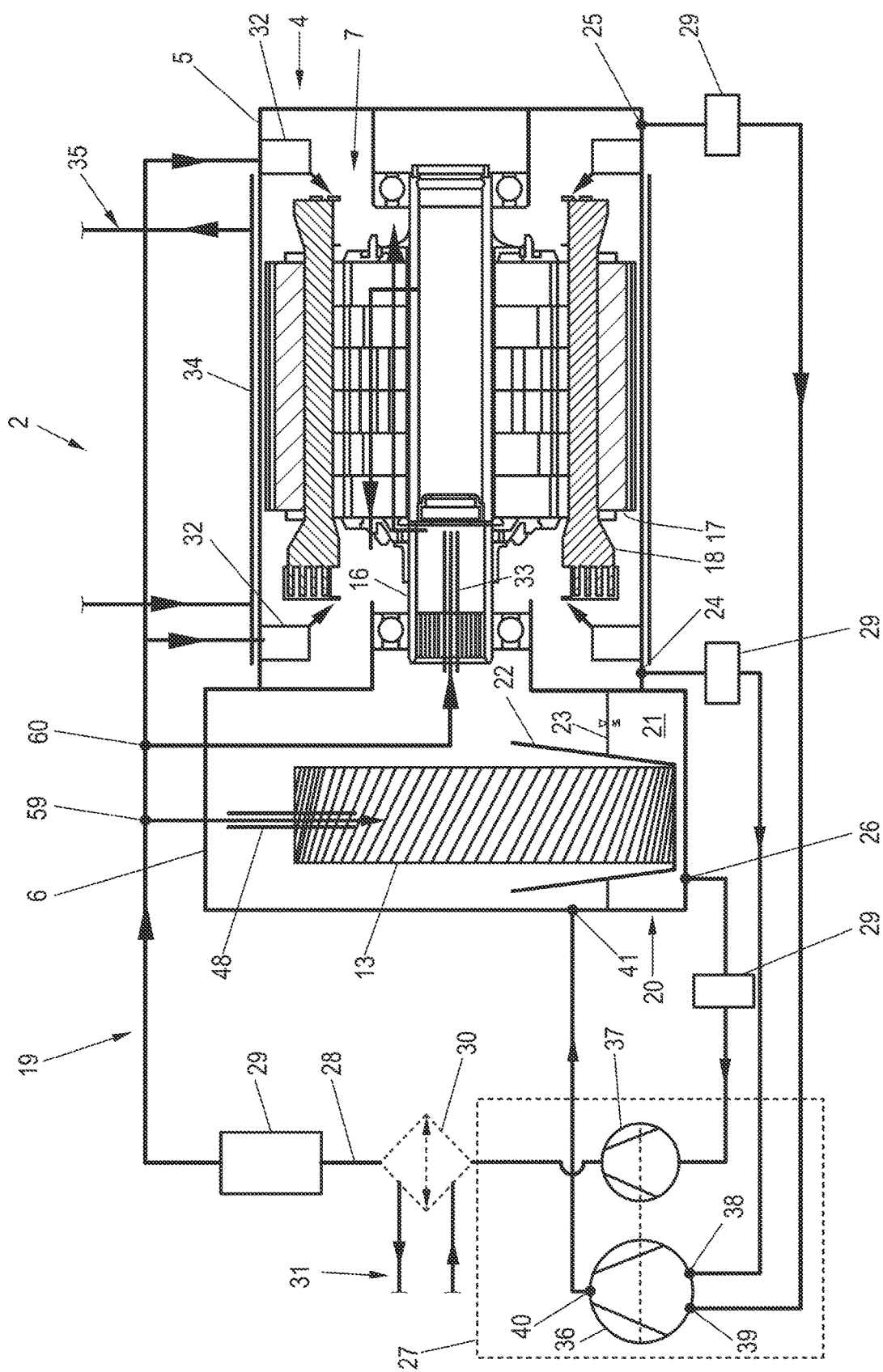
FIG. 2 shows a first embodiment of the gear motor of the motor vehicle of FIG. 1.

The delivery device 27 comprising the pumps 36, 37 is a common component of the gear motor 2, as indicated in FIG. 2 by the dashed box. The delivery device 27 constitutes a triple pump hydraulically and a dual pump mechanically.

In the following, the circulation path of the oil 21 circulating in the oil circuit 19 of the gear motor 2 shown in FIG. 2 shall be described in summary manner. Starting from the oil collection tank 20, the oil 21 is drawn in through the suction outlet 26 and the following filtering and screening device 29 by the second pump 37, from which is passes through the heat exchanger 30 and the following filtering and screening device 29 to arrive at a first branching point 59 of the oil supply line 28. At this point, the oil flow branches into a transmission and an engine branch.

In the transmission branch, the oil 21 is introduced by the spray nozzle 48 into the transmission housing section 6 and thus supplied to the transmission 13. The oil 21 forms there an oil mist, which wets the components of the transmission 13. By force of gravity, the oil 21 or the oil mist settles downward in the transmission housing section 6 and lands either in the oil collection tank 20 once more or in the shell 22. In the second case, the oil 21 may form a kind of minimal oil sump at the bottom of the shell, yet because of the movement of the rotating component of the transmission 13 in the shell 22 it is taken up from the shell 22 and ultimately also ends up at some point in the oil collection tank 20 once again.

In the engine branch, the oil 21 goes at first to a branching point 60, from which a portion of the oil 21 is supplied to the delivery lance 33 to form the rotor internal cooling and the rest of the oil 21 is supplied to the spray rings 32. In both cases, the oil 21 ultimately arrives as an oil mist in the interior space of the engine housing section 5, where it finally settles by force of gravity at the suction outlets 24, 25 and from here it is taken by the first pump 36, each time passing through the filtering and screening device 29 following the suction outlets 24, 25, through the inlet 41 to the oil collection tank 20.

Figure 4:
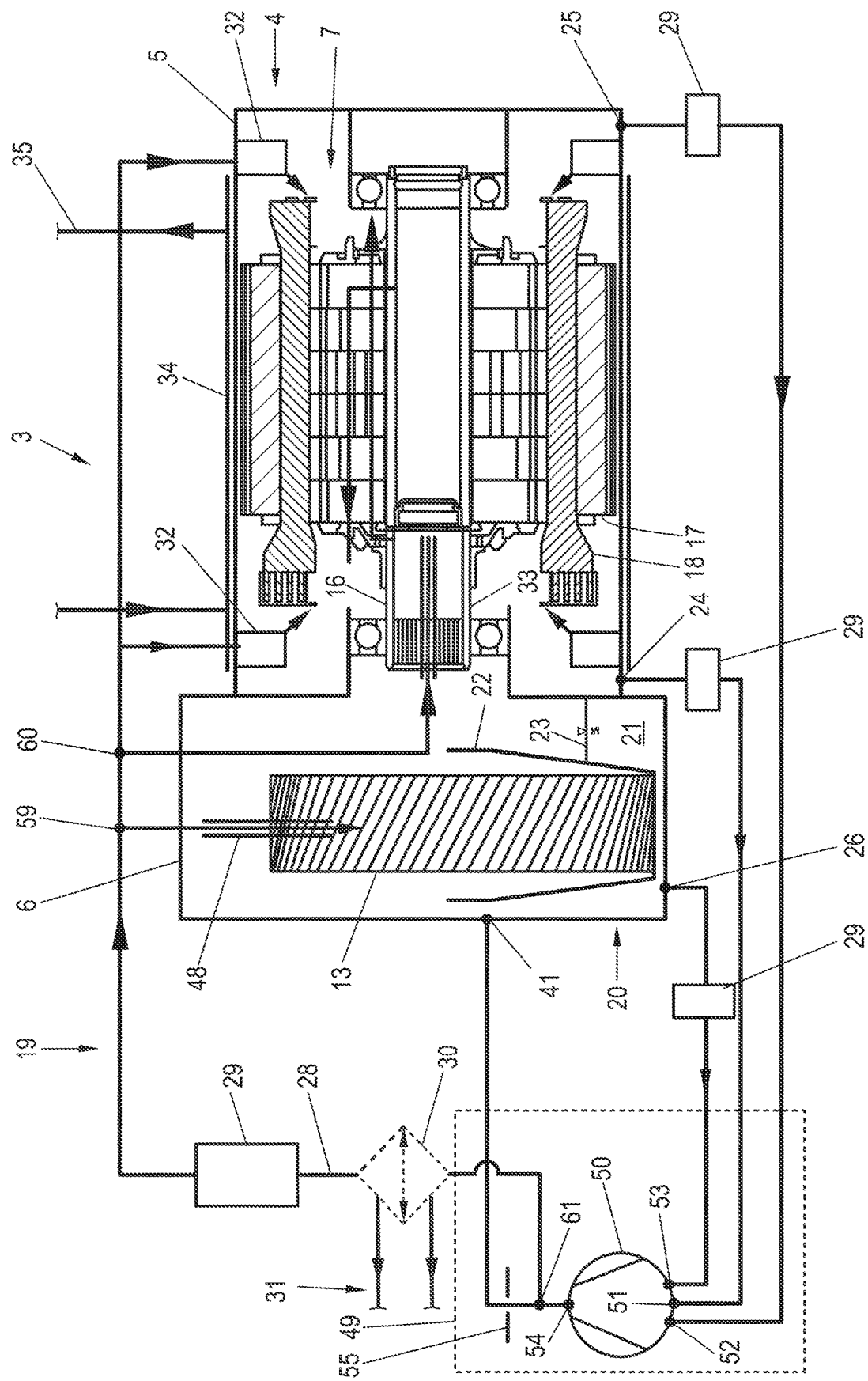
FIG. 4 shows a second embodiment of the gear motor of the motor vehicle of FIG. 1.

In the following, making reference to FIG. 4, a second embodiment of the gear motor 3 shall be explained, which may be in regard to the motor vehicle 1 shown in FIG. 1. Apart from the items explained in the following, the gear motor 3 shown in FIG. 4 corresponds to the gear motor 2 shown in FIG. 2, the same components being given the same reference numbers.

The gear motor 3 differs from the gear motor 2 in terms of the delivery device 49. This is designed in the gear motor 3 as a common pump 50, or comprises such a pump, thereby realizing a hydraulically triple and a mechanically single pump. The common pump 50 comprises three suction inlets 51-53, where the first suction inlet 51 is connected to the first suction outlet 24 and the second suction inlet 52 to the second suction outlet 25 of the engine housing section 5. The third suction inlet 53 is connected to the suction outlet 26 of the oil collection tank 20.

The common pump 50 has a common outlet 54 at the pressure side, through which the oil 21 can be delivered directly to the oil collection tank 20 as well as to the electric machine 7 and the transmission 13. At the pressure side, the oil line coming from the common pump 50 branches on the one hand across a diaphragm 55 to the oil collection tank 20 and on the other hand to the electric machine 7 and the transmission 13. The diaphragm 55 is provided as a small opening in the oil line, so that any air can escape from the oil circuit 19 at this place. The diaphragm 55 is small enough so that the oil 21 only emerges in extremely minimal amount from it, due to its viscosity.

Figure 5:
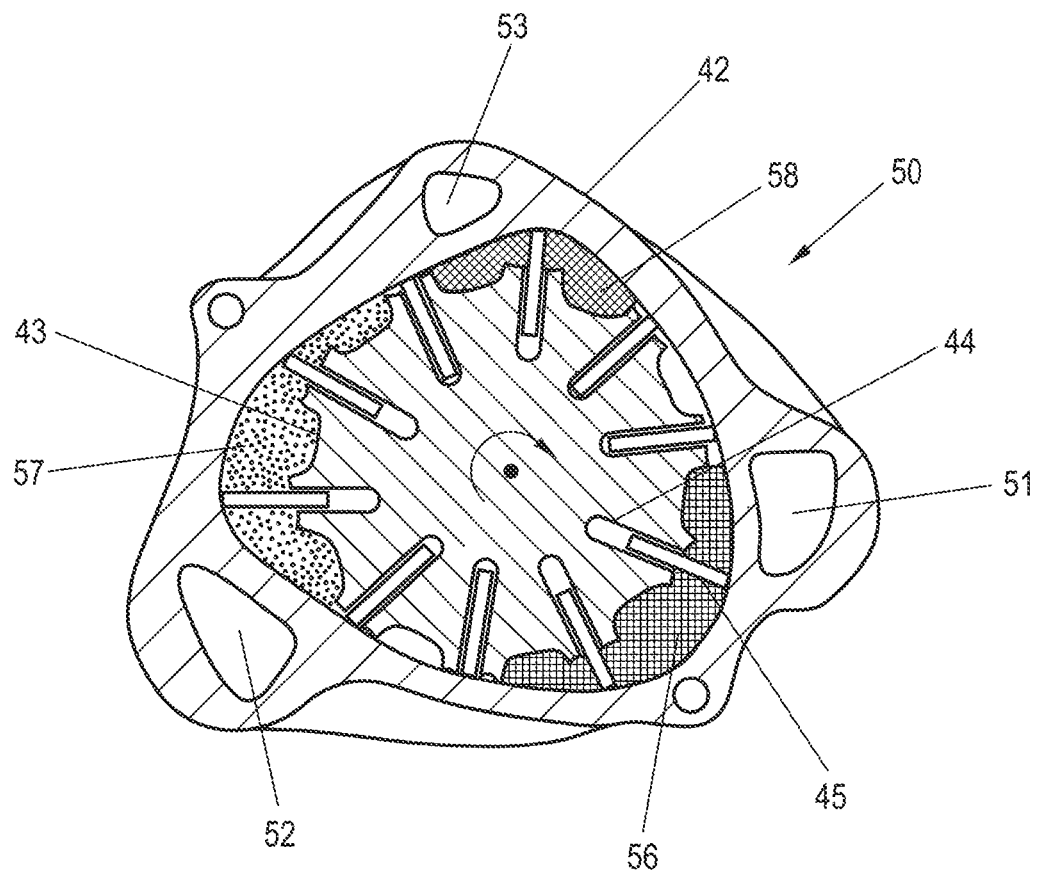
FIG. 5 shows a sectional view of a common pump of a delivery device of the gear motor of FIG. 4.

FIG. 5 shows a cross section of the common pump 50, being in the present case a three-stroke vane pump. Basically, this works by the same functional principle as the vane pump already explained with the aid of FIG. 3. One difference, however, is that the interior space of the stator 42 is triangular-oval in shape, so that three delivery volumes 56-58 are formed (indicated by the horizontally tiled and slanting tiled surface). The delivery volumes 56-58 communicate with the suction inlets 51-53 and each emerge in the outlet 54 at the pressure side, which is concealed by the rotor 43 in FIG. 5.

Thanks to the specific shape of the interior space of the stator 42, different sizes result for the delivery volumes 56-58, so that different delivery performance results accordingly in regard to the suction inlets 51-53. While the delivery volumes 56, 57 are symmetrically formed, so that the same oil delivery performance results in terms of the suction inlets 51, 52, the delivery volume 58 is comparatively smaller, so that a lower oil delivery performance results in regard to the suction inlet 53. Depending on the particular triangular-oval shape, the oil delivery performance at the suction inlets 51-53 can be designed as required. In the case of more than three suction inlets of the common pump 50, the interior space of the stator 42 may be polygonal-oval in order to form further delivery volumes.

In the following, the circulation path of the oil 21 circulating in the oil circuit 19 of the gear motor 3 shown in FIG. 4 shall be described in summary manner. Starting from the delivery device 49, the oil 21 goes directly to a pump branching point 61, where the oil flow branches into the oil supply line 28 and a line going to the oil collection tank 20.

Regarding the oil supply line 28, basically the same explanation given in terms of the gear motor 2 of FIG. 2 also holds for the gear motor 3, namely, that the oil 21 passes through the heat exchanger 30 and the following filtering and screening device 29 and then reaches the first branching point 59 of the oil supply line 28. Here, the oil flow branches into the transmission and the engine branch. Through the suction outlets 24-26, the oil 21 then arrives at the delivery device 49 once again. Regarding the oil 21 delivered from the pump branching point 61 to the oil collection tank 20, this goes at first to the already mentioned diaphragm 55 and then arrives through the inlet 41 in the oil collection tank 20.

German patent application no. 10 2022 109970.9, filed Apr. 26, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A gear motor for a motor vehicle, comprising:
    a housing having an engine housing section to contain an electric machine and a transmission housing section to contain a transmission coupled to the electric machine,
    wherein the electric machine, the transmission, and an oil collection tank are incorporated in an oil circuit,
    wherein oil for the cooling and/or lubricating of the electric machine and the transmission circulates in the oil circuit by at least one delivery device of the gear motor or the motor vehicle, and
    wherein the interior of the engine housing section and the interior of the transmission housing section are separated from each other such that the oil collects separately in the engine housing section and the transmission housing section at respectively at least one suction outlet connected to the delivery device, while a lower section of the transmission housing section in which the oil collects forms the oil collection tank.

2. The gear motor according to claim 1, wherein the engine housing section comprises at least two suction outlets situated at the bottom and on opposite sides of the engine housing section.

3. The gear motor according to claim 1, wherein the delivery device comprises a first pump and a second pump, wherein the oil can be delivered from the engine housing section through the first pump to the oil collection tank and from the oil collection tank through the second pump to the electric machine and the transmission.

4. The gear motor according to claim 3, wherein the first pump comprises at least two suction inlets, each of which is connected respectively to one of the suction outlets of the engine housing section, and a common outlet on the pressure side, which is connected to an inlet of the oil collection tank.

5. The gear motor according to claim 1, wherein the delivery device comprises a common pump connected at the intake side, separately, to the suction outlets of the engine housing and the oil collection tank, and at the pressure side to an inlet of the oil collection tank and at least one oil supply line leading to the electric machine and the transmission.

6. The gear motor according to claim 5, wherein the common pump comprises at least two suction inlets, one of which is connected to a suction outlet or at least one of the suction outlets of the engine housing section and another one which is connected to the suction outlet of the transmission housing section, and a common outlet on the pressure side, by which the oil can be delivered directly to the oil collection tank and to the electric machine and the transmission.

7. The gear motor according to claim 2, wherein the common pump comprises at least three suction inlets, at least two of which are connected to the suction outlets of the engine housing section.

8. The gear motor according to claim 1, wherein the delivery device is or comprises a vane pump.

9. The gear motor according to claim 3, wherein the first pump is a two-stroke vane pump or the common pump is a three-stroke vane pump.

10. The gear motor according to claim 1, wherein the transmission or at least one component of the transmission is accommodated at least partly inside at least one shell which is open at the top on one side, so that the oil collection tank is bounded by an interior wall of the transmission housing section and the shell and is open at the top, emerging into the rest of the interior space of the transmission housing section.

11. The gear motor according to claim 1, wherein the oil can be brought by at least one spray ring into the interior space of the engine housing section and/or by a delivery lance into a rotor shaft of the electric machine to produce a rotor internal cooling.

12. The gear motor according to claim 1, wherein a heat exchanger is incorporated in the oil circuit for control of the temperature of the oil and/or the engine housing section comprises a cooling water jacket, which can be incorporated in a cooling water circuit.

13. A motor vehicle, comprising:
    a gear motor according to claim 1.

* * * * *